(12) United States Patent
Kolganov et al.

(10) Patent No.: US 10,943,702 B2
(45) Date of Patent: Mar. 9, 2021

(54) DEVICE FOR ELECTRICALLY CONNECTING A BLANKET MODULE TO A VACUUM VESSEL OF A THERMONUCLEAR REACTOR

(71) Applicant: STATE ATOMIC ENERGY CORPORATION "ROSATOM" ON BEHALF OF THE RUSSIAN FEDERATION, Moscow (RU)

(72) Inventors: Vladimir Yuryevich Kolganov, Moscow (RU); Ivan Igorevich Poddubnyy, Likino-Dulevo (RU); Sergey Yuryevich Kirillov, Moscow (RU); Pyotr Dmitryevich Trofimovich, Moscow (RU)

(73) Assignee: STATE ATOMIC ENERGY CORPORATION "ROSATOM" ON BEHALF OF THE RUSSIAN FEDERATION, Moscow (RU)

( * ) Notice: Subject to any disclaimer, the term of this patent is extended or adjusted under 35 U.S.C. 154(b) by 0 days.

(21) Appl. No.: 16/334,050

(22) PCT Filed: Sep. 1, 2017

(86) PCT No.: PCT/RU2017/000639
§ 371 (c)(1),
(2) Date: Mar. 18, 2019

(87) PCT Pub. No.: WO2018/063026
PCT Pub. Date: Apr. 5, 2018

(65) Prior Publication Data
US 2019/0259502 A1    Aug. 22, 2019

(30) Foreign Application Priority Data
Sep. 16, 2016 (RU) .................................. 2016137225

(51) Int. Cl.
*G21B 1/17* (2006.01)

(52) U.S. Cl.
CPC ...................................... *G21B 1/17* (2013.01)

(58) Field of Classification Search
CPC .................................. G21B 1/17; G21B 1/13
(Continued)

(56) References Cited

U.S. PATENT DOCUMENTS

2011/0216866 A1    9/2011  Pearson
2019/0074608 A1*   3/2019  Elkin ....................... G21B 1/17

FOREIGN PATENT DOCUMENTS

RU    118100 U1     7/2012
RU    2579444 C1    4/2016

OTHER PUBLICATIONS

International Search Report of corresponding International application No. PCT/RU2017/000639 dated Jan. 11, 2018, English translation and Russian, 3 pages.
(Continued)

*Primary Examiner* — Jack W Keith
*Assistant Examiner* — Daniel Wasil
(74) *Attorney, Agent, or Firm* — Brooks Kushman P.C.

(57) ABSTRACT

The invention relates to the field of thermonuclear fusion and can be used in devices for electrically connecting components situated inside a nuclear fusion reactor chamber to the vacuum vessel of the reactor. A device for electrically connecting components situated inside a nuclear fusion reactor chamber to the vacuum vessel of the reactor comprises two identical stacks of electrically conductive plates. The electrically conductive plates are in the shape of a symmetrical wave having at least one full period. The plates in a stack are nested one inside another and are connected to flanges for attachment to a component situated inside the chamber and to the vacuum vessel. The stacks of electrically (Continued)

conductive plates are mounted with mirror symmetry about a line that passes through the centers of symmetry of the flanges.

2 Claims, 2 Drawing Sheets

(58) Field of Classification Search
USPC .......................................................... 376/150
See application file for complete search history.

(56) References Cited

OTHER PUBLICATIONS

Written Opinion of corresponding International application No. PCT/RU2017/000639 dated Jan. 11, 2018, English translation and Russian, 7 pages.
International Preliminary Report on Patentability of corresponding International application No. PCT/RU2017/000639 dated Mar. 19, 2019, English translation and Russian, 9 pages.
International Atomic Energy Agency, ITER Technical Basis, ITER EDA Documentation Series No. 24, Plant Description Document, Chapter 2.3, Vienna, 2002.

\* cited by examiner

DEVICE FOR ELECTRICALLY CONNECTING A BLANKET MODULE TO A VACUUM VESSEL OF A THERMONUCLEAR REACTOR

CROSS-REFERENCE TO RELATED APPLICATION

This application is the U.S. national phase of International Application No. PCT/RU2017/000639 filed on Sep. 1, 2017, which claims priority to Russian Patent Application No. RU 2016137225 filed on Sep. 16, 2016, the disclosures of which are incorporated in their entirety by reference herein.

FIELD OF THE INVENTION

The invention relates to the thermonuclear fusion and can be used in devices for electrically connecting components situated inside a nuclear fusion reactor chamber to the vacuum vessel of the reactor.

BACKGROUND OF THE INVENTION

It is known the device for electrically connecting components situated inside the nuclear fusion reactor chamber to the vacuum vessel of the reactor, comprising electrically conductive plates, nested in one stack, with differently directed surface areas provided between flanges for attachment to the component situated inside the chamber and to the vacuum vessel (International Atomic Energy Agency (MAFAT3), Vienna, 2002 ITER TECHNICAL BASIS, ITER EDA Documentation series No. 24, Plant Description Document, Chapter 2.3, Page 10-2.3.4.3 Electrical Connection, Figure 2.3.4-4 One Strap of the Electrical Connection).

In the known device, the surface of plates with differently directed surface areas is L-shaped and is perforated. The plates are nested one inside another to form a single U-shaped stack. In the known device, due to perforations and folds in the plates, the stack of electrically conductive plates is insufficiently compliant in the direction normal to the plane of the side parts. In addition, as far as the electrically conductive plates have vertical sections guiding electrical current perpendicularly to the main (toroidal) magnetic field component, this can result in higher electromagnetic forces acting on the device.

The drawback of the known device is that in a case of plasma disruption it has a limited current loading capacity when a current flows therethrough. The current which flows perpendicularly to the magnetic field (the maximal value of a magnetic field toroidal component of a tokamak can be about 9 T) applies a great force on the device which can be several dozens of kilonewtons. The maximal force acts on a conductor which is perpendicular to the magnetic field. Therefore, the current loading capacity of the known device is limited by the compliance of the stack of electrically conductive plate elements, the magnetic field toroidal component of a nuclear fusion reactor, and by the presence of electrically conductive regions of the device which are perpendicular to the magnetic field.

The set of features closest to the claimed invention has the device for electrically connecting components situated inside the nuclear fusion reactor chamber to the vacuum vessel of the reactor, comprising electrically conductive plates in the shape of a symmetrical wave having at least one full period, nested one inside another and connected to flanges for attachment to the component situated inside the chamber and to the vacuum vessel (see RU Patent 2579444, IPC G21B1/17, published on 10 Apr. 2016).

The drawback of the known device is its reduced current loading capacity while nonpermanent (alternating or pulse) current flowing therethrough. This can be explained by that the electrically conductive plates in a stack center conduct significantly less nonpermanent current than plates outside the stack, which is caused by the surface effect or the skin effect. A further drawback of the known device is the reduced current loading capacity associated with a local increase in current density of electrically conductive plates appearing at junction (transition) points between the plates and the flanges, i.e., the most proximate points to current supply and drainage sites. This can be explained by that the plates in the stack are arranged so that a generatrix of a plate symmetrical wave is in a plane which is perpendicular to flange contact surfaces.

DISCLOSURE OF THE INVENTION

The object of the present invention is to increase the current loading capacity of a device for electrically connecting components situated inside a nuclear fusion reactor chamber to a vacuum vessel of a reactor when a nonpermanent (alternating or pulse) current flows through electrically conductive plates.

The technical result of the present invention is that of ensuring a substantially identical skin effect on all of the electrically conductive plates of the device. In addition, the technical effect of this is reducing the force of attraction between the outermost and center plates (the force of attraction between conductors carrying unidirectional currents) and providing uniform current density distribution in each electrically conductive plate.

Said technical effect is achieved by that the known device for electrically connecting components situated inside a nuclear fusion reactor chamber to a vacuum vessel of a reactor, comprising electrically conductive plates in the shape of a symmetrical wave having at least one full period, nested one inside another and connected to flanges for attachment to the component situated inside the chamber and to the vacuum vessel, according to the present invention is provided with a second identical stack of electrically conductive plates, wherein said stacks are mounted with mirror symmetry about a line that passes through the centers of symmetry of the flanges.

In addition, plates in stacks are arranged so that a generatrix of an electrically conductive plate wave is in a plane which is parallel to flange contact surfaces.

Two stacks in the device reduce attractive forces between outermost electrically conductive plates and central electrically conductive plates (attractive forces of conductors with a uni-directional current) because the number of plates in the stack is twice less than in the device generally. Two plate stacks mounted with mirror symmetry and plates mounted along the generatrix in the plane which is parallel to the flange contact surfaces allow minimizing the skin effect-associated uneven current distribution among the plates. In addition, in the device according to the present invention, it is possible to implement a Z-shaped connection scheme, thus, ensuring as even as possible distribution of current among plates. Said technical effects can increase the loading capacity of the device or can reduce dimensions of the device while keeping the same loading capacity as in the prior art.

BRIEF DESCRIPTION OF THE DRAWINGS

The subject matter of the present invention is described by the drawings, where.

PREFERRED EMBODIMENT OF THE INVENTION

Figure 1:
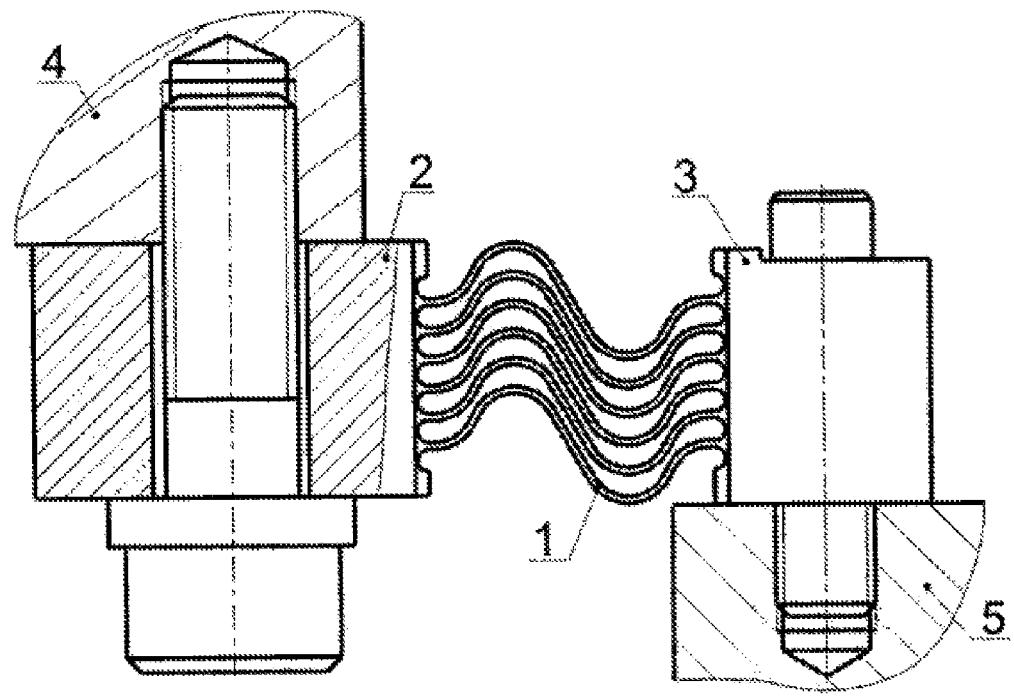
FIG. 1 is a device for electrically connecting components situated inside a nuclear fusion reactor chamber to a vacuum vessel of a reactor (a side view)
Figure 2:
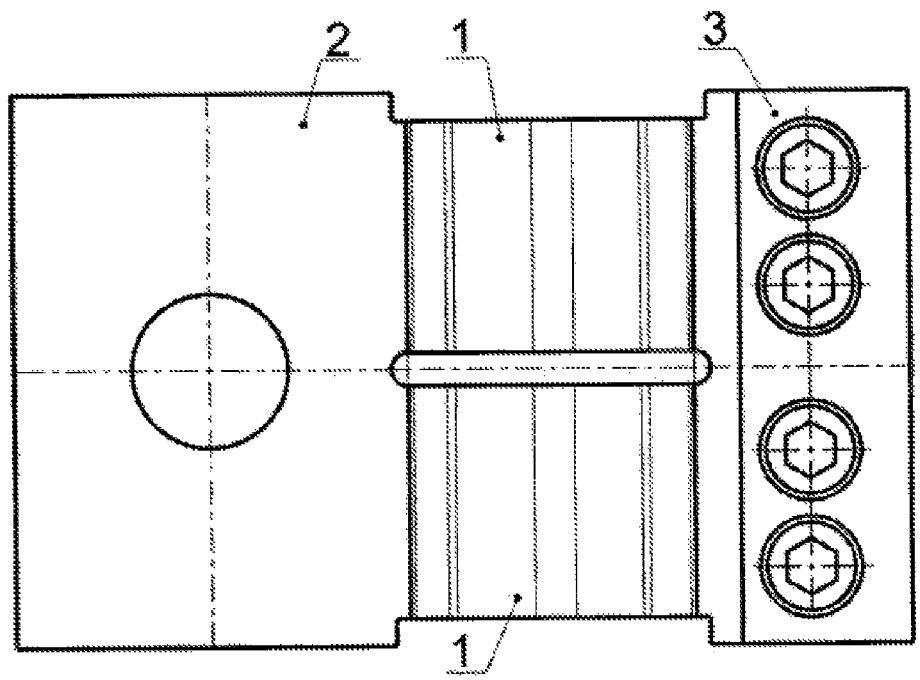
FIG. 2 is the device according to FIG. 1 (a plane view)
Figure 3:
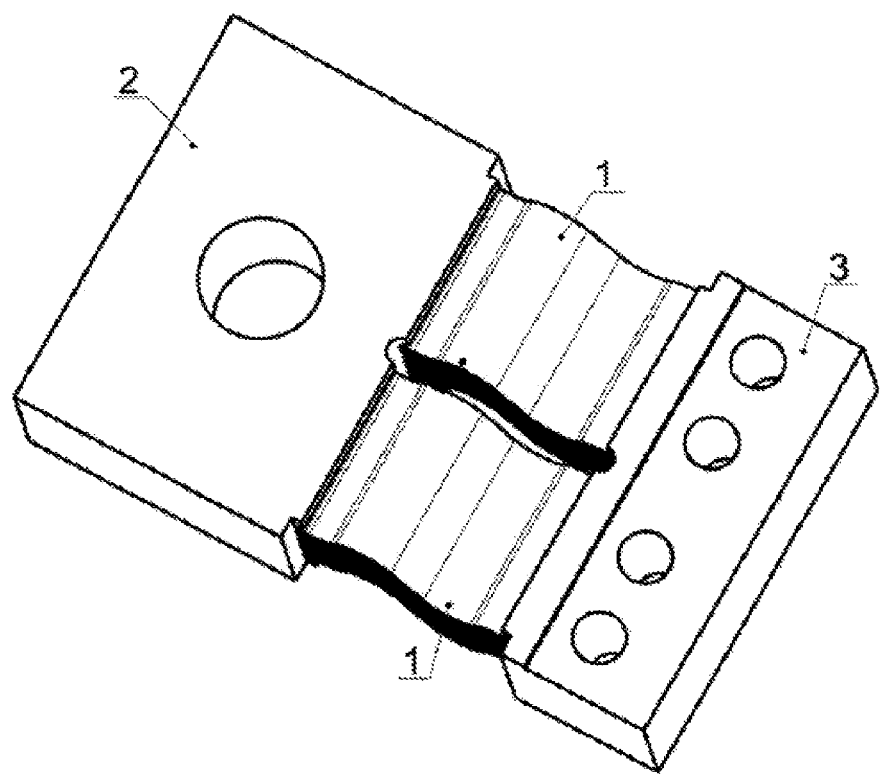
FIG. 3 is the isometric view of the device.
Figure 4:
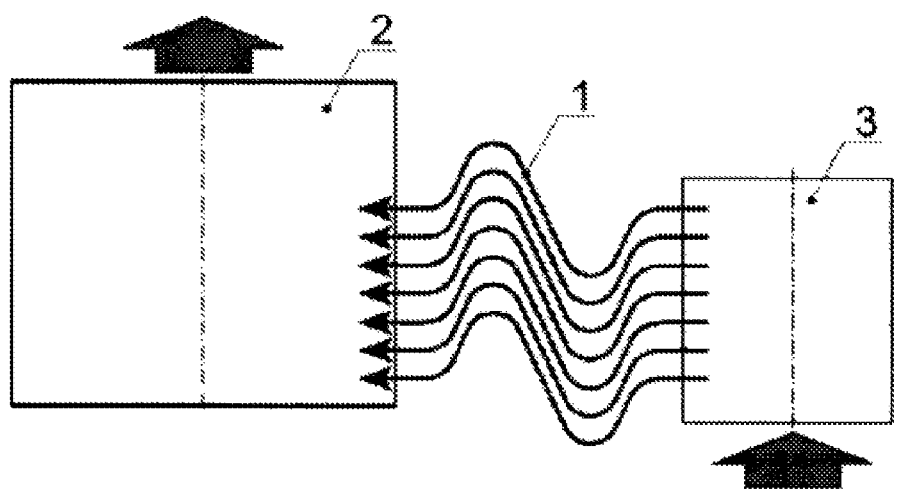
FIG. 4 is a diagram of Z-shaped current flow through the device.

A device for electrically connecting components situated inside a nuclear fusion reactor chamber to a vacuum vessel of the reactor comprises two identical stacks of electrically conductive plates 1 and flanges 2, 3 for attachment to a vacuum vessel 4 and a component 5 situated inside a chamber, respectively. Said stacks of electrically conductive plates are mounted with mirror symmetry about a line that passes through the centers of symmetry of the flanges 2, 3. The electrically conductive plates 1 are in the shape of a symmetrical wave having at least one full period. Based on the layout needs, surfaces of the electrically conductive plates 1 can be in the shape of a symmetrical wave having more than one full period. In each stack, the electrically conductive plates 1 are nested one inside another by means of tongues and corresponding slots and jointed to the flanges 2, 3 for attachment to the component 4 situated inside the chamber and the vacuum vessel 5, for instance, by means of a mechanical, brazed or welded joint, or made integral (one-piece) with the flanges. The plates 1 in stacks are arranged so that a generatrix of a wave of the electrically conductive plate 1 passes in a plane which is parallel to contact surfaces of the flanges 2 and 3. The flanges 2 and 3 are provided with mounting holes for attachment to the vacuum vessel 4 and the component 5 situated inside the chamber (a blanket module) of the reactor.

INDUSTRIAL APPLICABILITY

The device functions as follows.

If plasma is disrupted, a great transient current, which varies in some modes at a frequency that causes a drastic skin effect, is required to be drained from the component 5 situated inside the chamber to the vacuum vessel 4 of the fusion reactor. The current flows into the device from the component 5 situated into the chamber through the flange 2. From the flange 2, the current flows inside the device via two stacks of electrically conductive plates 1 towards the flange 3. From the device, and via the flange 3, the current flows into the vacuum vessel 4 of the fusion reactor. When the current flows via the electrically conductive plates 1, thanks to two stacks and the generatrices of the electrically conductive plates 1 parallel to the contact surfaces of the flanges 2 and 3 for all electrically conductive plates 1 of the device, the skin effect can be substantially uniform. In addition, the forces of attraction between outermost electrically conductive plates 1 and central electrically conductive plates which are associated with a uni-directional current, are lower in the case of electrically conductive plates 1 gathered in two stacks, rather than in one stack, and current density distribution is uniform per electrically conductive plate 1.

The invention claimed is:

1. A device for electrically connecting components situated inside a nuclear fusion reactor chamber to a vacuum vessel of a reactor, comprising:
   a first stack of electrically conductive plates nested one inside another and having the shape of a symmetrical wave of having at least one full period,
   wherein the first stack of electrically conductive plates are jointed to flanges for attachment to a component situated inside the chamber and to the vacuum vessel;
   a second stack of electrically conductive plates identical to the first stack of electrically conductive plates, wherein the second stack of electrically conductive plates are jointed to the flanges;
   wherein the stacks are mounted with mirror symmetry about a line that passes through the centers of symmetry of the flanges.

2. The device according to claim 1, wherein the plates in stacks are arranged so that a generatrix of an electrically conductive plate wave is in a plane which is parallel to contact surfaces of the flanges by which the plates are attached to the
   vacuum vessel and to the component situated inside the chamber.

* * * * *